United States Patent
Perez Vales

(10) Patent No.: US 6,725,889 B2
(45) Date of Patent: Apr. 27, 2004

(54) AUTOMATIC EQUIPMENT FOR VENDING WHOLE-GRAIN PRODUCTS SUCH AS COFFEE OR OTHER PRODUCTS

(76) Inventor: Maria Pilar Perez Vales, Via Europa 51—53010 S. Rocco a Pilli, Sociville, Siena (IT)

( * ) Notice: Subject to any disclaimer, the term of this patent is extended or adjusted under 35 U.S.C. 154(b) by 0 days.

(21) Appl. No.: 10/169,005

(22) PCT Filed: Dec. 18, 2000

(86) PCT No.: PCT/IT00/00529
§ 371 (c)(1),
(2), (4) Date: Sep. 10, 2002

(87) PCT Pub. No.: WO01/48711
PCT Pub. Date: Jul. 5, 2001

(65) Prior Publication Data
US 2003/0057234 A1 Mar. 27, 2003

(30) Foreign Application Priority Data
Dec. 23, 1999 (IT) .......................... FI99A0261

(51) Int. Cl.⁷ ................................. B65B 1/04
(52) U.S. Cl. ................. 141/104; 141/286; 141/301; 141/302
(58) Field of Search ............... 141/104, 286, 141/301, 302, 305; 222/145.1, 144.5; 241/34, 36, 38, 100, 101.6, 101.8

(56) References Cited

U.S. PATENT DOCUMENTS

| | | | |
|---|---|---|---|
| 583,544 A | * 6/1897 | Patroli | 241/100 |
| 4,815,633 A | 3/1989 | Kondo et al. | |
| 5,158,793 A | * 10/1992 | Helbling | 426/231 |
| 5,263,651 A | * 11/1993 | Nadarajah | 241/34 |
| 5,381,969 A | 1/1995 | Paulig | |
| 5,603,458 A | * 2/1997 | Sandolo | 241/34 |
| 5,632,449 A | * 5/1997 | Sandolo | 241/34 |
| 5,685,435 A | 11/1997 | Picioccio et al. | |
| 5,690,283 A | * 11/1997 | Sandolo | 241/34 |
| 6,349,889 B1 | * 2/2002 | Sandolo | 241/34 |

FOREIGN PATENT DOCUMENTS

| | | |
|---|---|---|
| EP | 0 736 279 | 10/1996 |
| WO | WO 97/41763 | 11/1997 |

* cited by examiner

Primary Examiner—Gregory L. Huson
Assistant Examiner—Khoa Huynh
(74) Attorney, Agent, or Firm—Mcglew and Tuttle, P.C.

(57) ABSTRACT

The equipment comprises: a plurality of containers in the form of bins (19A, 19B, . . . ), at the base of each of which a remotely controlled dispenser (21A; 21B; . . . ) can supply approximate quantities of the product by allowing it to fall from the corresponding container; channels (33A) capable of collecting the products supplied and of discharging them via a deflector (39) toward one or other of two housings (15A; 15B) for a packaging wrapper (5A, 5B) designed to package product received from the hopper, a grinder (15) being positioned above one (15B) of the housings. A computerized apparatus (50) is used for indicating and entering the individual selections and operations to be carried out.

8 Claims, 5 Drawing Sheets

AUTOMATIC EQUIPMENT FOR VENDING WHOLE-GRAIN PRODUCTS SUCH AS COFFEE OR OTHER PRODUCTS

DESCRIPTION

The object of the invention is to automate the services associated with the vending of loose granular products—such as grains, rice, pasta of relatively small sizes, and particularly coffee—to be dispensed in variable amounts at will, for packaging by the purchaser.

In certain cases, the invention also permits the formation of blends of different products, with proportions variable at will, for example in order to form blends of different varieties of coffee. It is also possible to use the equipment in question to grind the product if it is not wanted in whole-grain form.

All of the above is achieved with practically no need for the costly presence of operating personnel, and with an increase in the speed of all the operations associated with these types of product.

These and other objects and advantages are made clear by the following text.

The invention relates to equipment which essentially comprises, in combination:
  a plurality of containers in the form of bins;
  a dispenser at the base of each container, to supply the product by allowing it to fall from the corresponding container;
  a hopper and/or a set of channels below the container, to collect the product supplied by each dispenser;
  at least one housing to support a wrapper capable of receiving, for packaging purposes, the dispensed product or products;
  a computerized apparatus for indicating and entering the individual selections and operations to be carried out for the measurement and dispensing of measured quantities—individual and/or mixed—into the packaging wrapper;
  and a sensor capable of indicating the presence of the packaging wrapper in the housing, and of permitting the discharge.

The equipment can comprise a deflector and at least two housings for packaging wrappers, and a grinder upstream from at least one of said housings; in this case, a selection command can be provided for a request for the product in whole-grain or ground form, this request being made by said computerized apparatus or by a manual operation.

The computerized apparatus can comprise keys for the selection of the product or products to be dispensed; keys for setting the measurement of a product or of a plurality of products; a key for commanding the activation of the measuring dispenser or dispensers and of the discharge, and for the deflector.

Said computerized apparatus can also comprise means for displaying information to be used for the operations to be carried out in sequence.

The computerized apparatus can also comprise display means and indicators for the selection of the degree of grinding to be carried out with the grinder, by manual entry operations or by remote control if necessary.

The equipment in question can also comprise scales for precise weighing and for supplying the corresponding ticket, which is advantageously adhesive.

The invention will be more clearly understood from the description and the attached drawing, which shows a non-restrictive practical example of the invention. In the drawing, FIG. 1 shows a perspective view from the front of the whole of the equipment;

Figure 1:
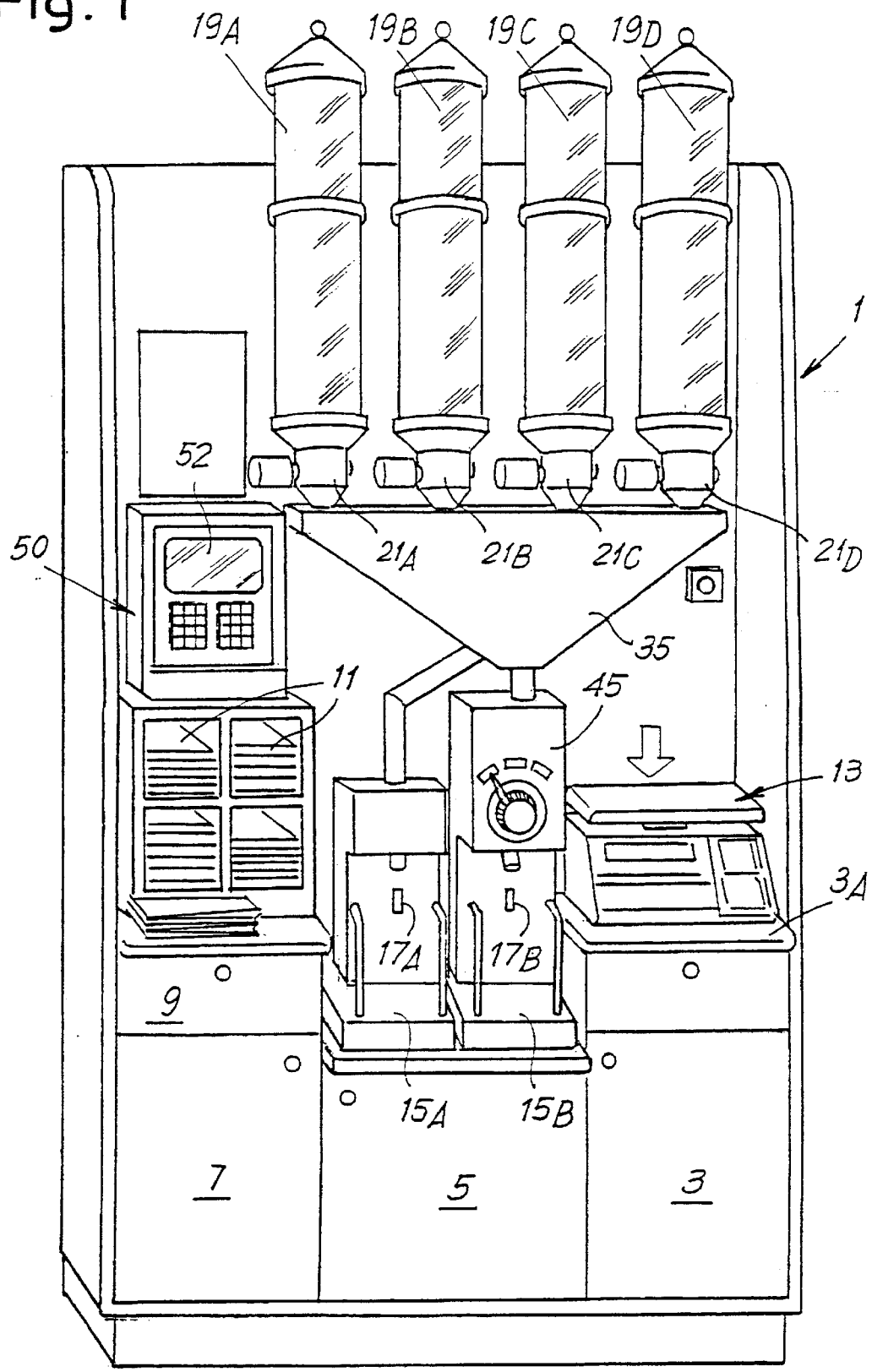

According to the illustrations in the attached drawing, the number 1 indicates the whole of a structure which can be positioned in an environment easily accessible to customers who wish to obtain a product or a mixture of products by using the equipment in question, and without the necessity for the presence of an operator employed for this specific purpose. The numbers 3, 5, 7, 9 and 11 indicate spaces and compartments which are easily accessible for the operation of the equipment in question, the compartments 11 being capable, in particular, of housing packaging bags to be used by the public; above the compartments 3 and 5, shelves 3A and 5A are provided to hold, respectively, scales 13 and a pair of housings 15A and 15B where corresponding bags can be positioned to be filled with the products selected and handled by means of the equipment. Indicator lamps 17A, 17B can be provided in correspondence of these supporting housings 15A and 15B for the purpose of checking whether or not a bag is present in the housing 15A or 15B, in such a way as to provide an indication of the possible absence of one of these bags, as required for the packaging of the product selected by the user.

The numbers 19A, 19B, etc., indicate a plurality of containers in the form of bins of suitable capacity which contain different products to be offered to the customers for the packaging of the desired products; the example shows four containers, which can contain, for example, four different varieties of coffee or of mixtures of coffee, identified by the characteristic names for each of these varieties. The containers 19 are cylindrical in the example, and are advantageously transparent, and can also have some indication of their content on their surfaces visible from the front. Each of the containers 19 has at its bottom a measuring dispenser, the various dispensers being indicated by 21A, 21B, etc.

Figure 3:
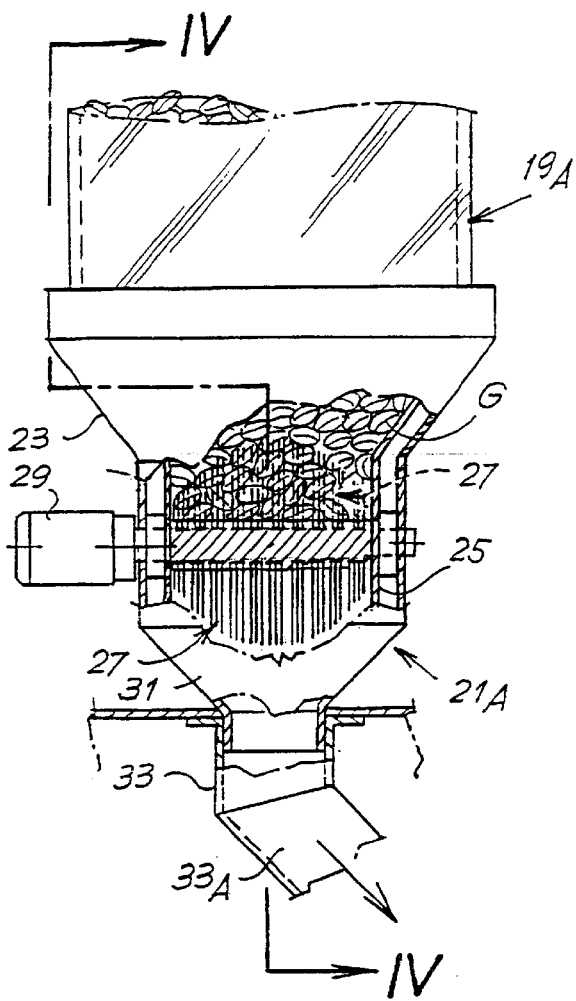
FIGS. 3 and 4 show a detail of the part indicated by the arrow f3 in FIG. 2, FIG. 4 being a section through IV—IV in FIG. 3 and FIG. 3 being a section through III—III in FIG. 4.
Figure 4:
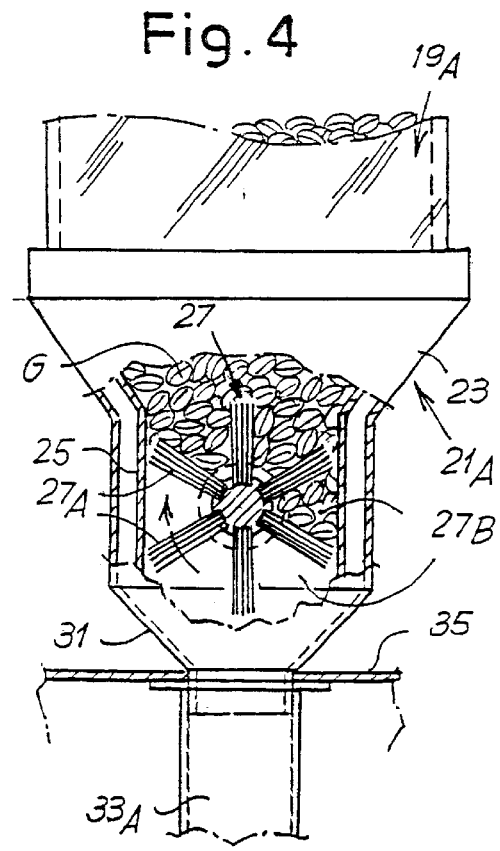

FIGS. 3 and 4 show one of the aforesaid dispensers in greater detail. The dispenser has a funnel-shaped wall 23 designed to guide the loose grains from the container 19 towards a cylindrical (or prismatic) wall 25 in which is housed a brush rotor 27 which is driven in controlled angular steps by a stepping motor or in any case by a motor providing the possibility of controlling the angular movement of the motor shaft and therefore of the rotor 27 about the horizontal axis X-X. The rotor extends so that its overall shape is that of a sphere (or a shape matching that of the wall 25) and consists of a plurality of longitudinal rows of tufts of bristles 27A which form flexible diaphragms capable of preventing the free fall of granules lying on them, but capable of permitting the filling of the sector-shaped compartments 27B which lie between the different longitudinal rows of tufts 27A. Consequently, when a predetermined and suitable angular displacement of the shaft of motor 29 and therefore of the brush rotor assembly 27 is provided, it is possible to discharge a predetermined quantity of granules which corresponds to a predetermined number of compartments 27B which can contain granules whose quantity, and therefore whose weight, is predetermined at least approximately (the weight being calculated as a function of the volume of the compartments 27B and the size of the granules); it is therefore possible to check the number of batches of granules which are contained in the sectors 27B and which pass from a position which is open upwardly, in other words toward the container 19, to a funnel-shaped collecting-wall 31 for discharge downward toward a discharge duct 33. By determining the size of the angular travel which the motor 29 is made to undergo, it is therefore possible to determine a weight approximately corresponding to a predetermined value as a function of this angular displacement of the motor 29 and therefore of the rotor 27, and therefore to discharge a whole number of elementary batches which can be contained in each of the sectors 27B formed by the rows of bristles 27A of the rotor 27.

The discharge ducts 33 of the various measuring dispensers 21A, 21B etc. are located above a hopper 35, which is therefore capable of collecting the discharges from any of the dispenser(s) which has (or have) been activated. More particularly, each of the discharge ducts 33 has a corresponding channel 33A in the form of a spout, along which the product from the corresponding dispenser 21 can slide into a chamber 37; the channels 33A make the fall of the granules quieter than would the hopper 35, which can have a purely esthetic function. It is possible for a deflector 39 to operate within the chamber 37, and to be placed in either of two positions, of which one 39A is indicated by solid lines while the other 39B is indicated by broken lines; this deflector 39, operating with an angular movement between the two positions 39A and 39B, allows the product supplied by the dispenser or dispensers 21 to be discharged toward a duct 41 (in the position 39A of the deflector 39) or toward a duct 43 (in the position 39B of the deflector 39); the deflector 39 can be driven by a suitable remotely controlled motor which moves it angularly as shown by the two arrows in the drawing, to bring the flap of the deflector into one or other of the two positions 39A and 39B.

The duct 43 allows the product from one or another or from more than one of the dispensers 21A, 21B etc. to be discharged into the housing 15A, to permit the filling of a bag SA located in the housing 15A; the other duct 41 discharges into a grinder 45, which in turn can discharge the ground product into a bag positioned as indicated by SP in the housing 15B. It should be noted that the indicator lamps 17A and 17B enable the presence or absence of the bag in the position SA or in the position SB to be checked, and are designed to permit an operation only when the bag is present in the corresponding housing 15A or 15B.

Figure 2:
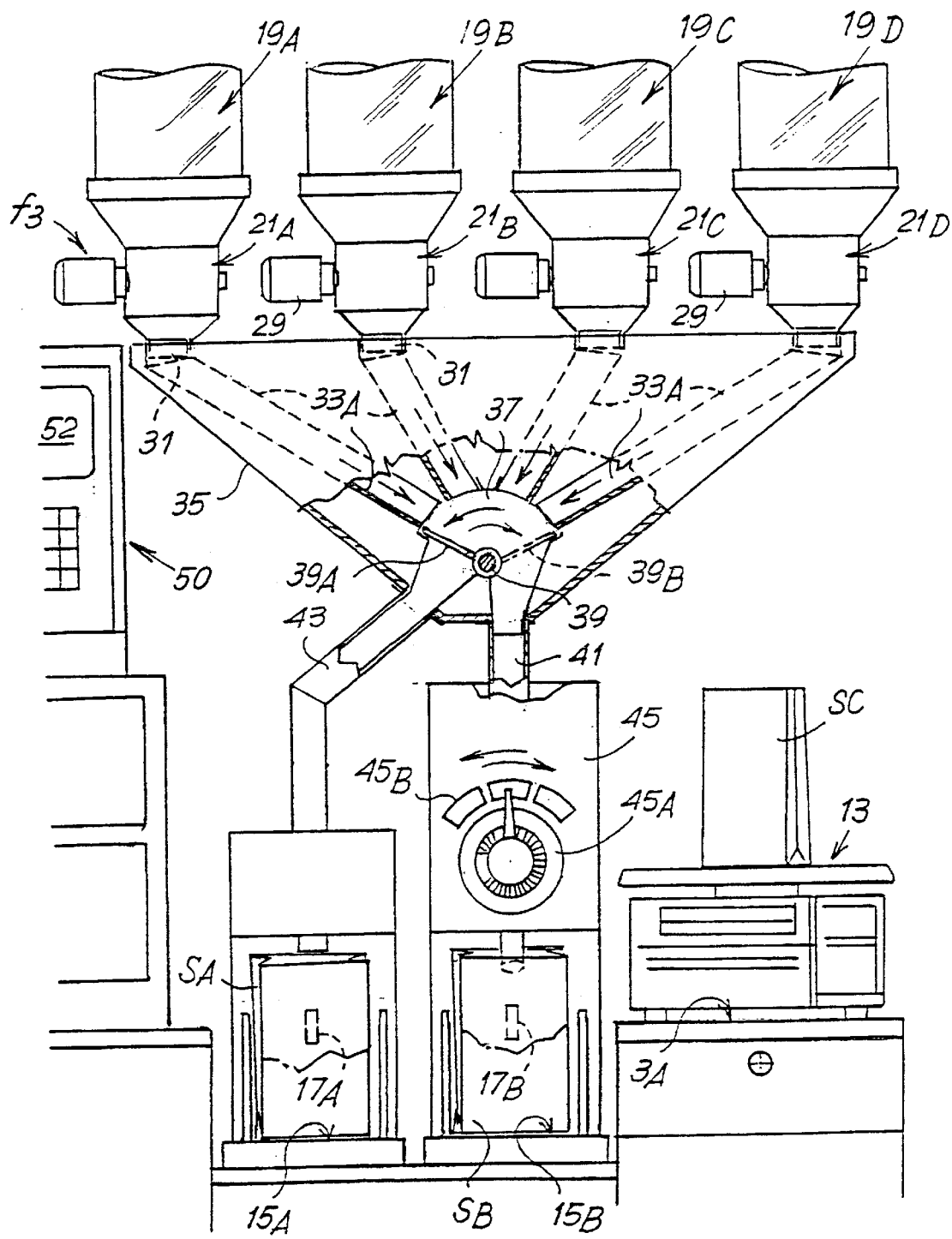
FIG. 2 shows an enlarged detail, in partial section, of said equipment, with parts removed.

The grinder 45 can be adjusted to provide a different particle size of the ground product, with the provision of three different particle sizes for example, by moving an operating knob 45A into one or other of three positions, in order, for example, to cause coffee beans to be ground in one of the three grades required for making coffee in machines of either the "filter" or the "mocha" or the "espresso" type, and this can be indicated on a card 45B (FIG. 2).

Scales 13 can be placed on the surface 3A adjacent to the housings 15A and 15B, so that the purchaser who has received the product or products discharged by a dispenser or by a plurality of dispensers can collect the filled bag SA or SB and weigh it by placing it as indicated by SC in FIG. 2 on the scales 13, to obtain an indication of the exact price and the indication of the total price, and also to cause the output (as provided in many commercially available scales) of a ticket to be used at the check-out, which can be applied to the bag SC by the purchaser, by means of an adhesive surface.

The number 50 indicates as a whole a computerized apparatus which is used to permit the automatic operation of the equipment in question by the purchaser who wishes to purchase products selected from one or more of those in the various bin containers 19. The equipment 50 is provided with a screen, known as a "display", which can be used to provide the purchaser with the necessary and sufficient information for specifying the various operations necessary for the purchase.

FIGS. 5 to 8 show, by way of example, some of the information which is to appear in sequence on the screen 52, which, in the solution illustrated in said figures, is of the type which comprises touch-sensitive keys for entering the data required for purchases. It should be stated in the first place that the equipment in question can be used for any whole-grain product, for example, and in particular, for coffee beans to be contained in the containers 19, in different varieties or blends, or for short pasta or any pasta other than the long type such as spaghetti, for rice, for sweetcorn, for wheat, or the like, for hazelnuts or almonds, and for any other product in granular form, including confectionery and pastries.

A typical application is to coffee, which customers very frequently require in special blends, which normally have to be prepared and then packaged selectively in different measured quantities and in separate packages or in packages which have to be filled with the various measured quantities, requiring the presence of a skilled operator who can receive the requests and create the blends. On the contrary, with the equipment in question, the customer and purchaser can produce his own blend with the desired measured quantities for each type of blend, for example for the blends of different coffees of known varieties (such as "Columbia", "Kenya", "Brazil", or special "Blends" of different varieties). The equipment is used in the following way for the purchase of customized blends.

Figure 5:
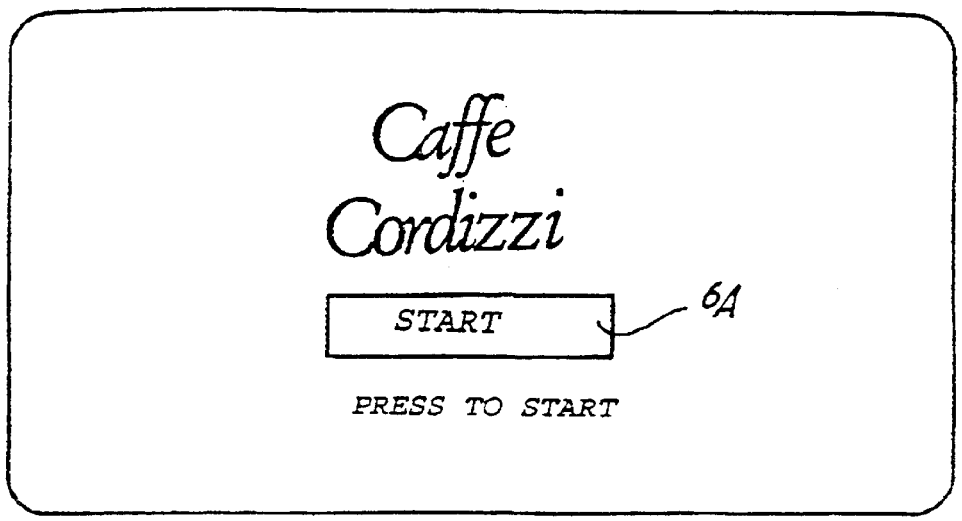
FIGS. 5, 6, 7 and 8 show a set of successive indications which appear on a screen (display) of the equipment.
Figure 6:
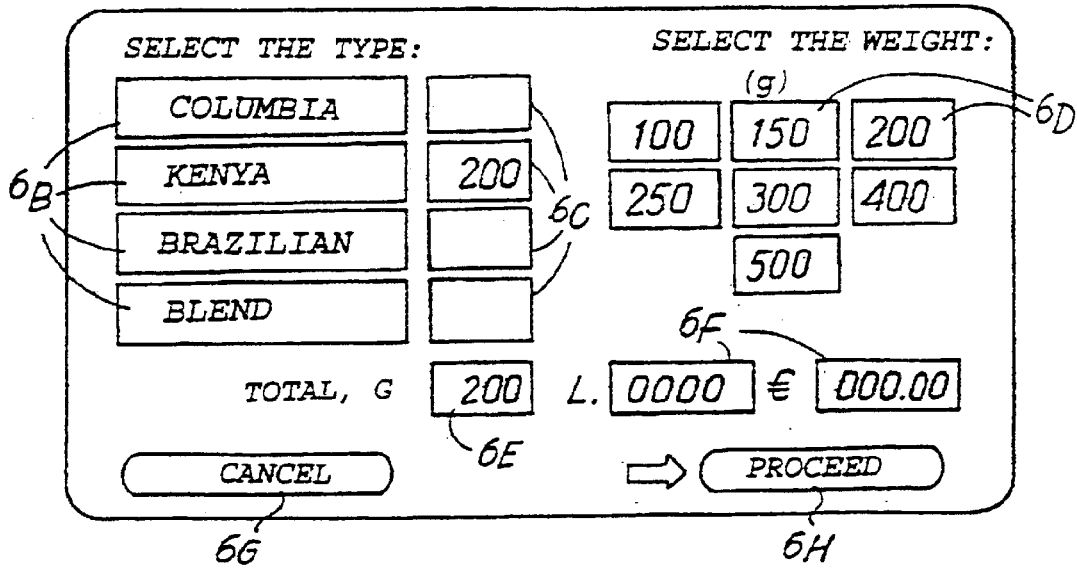
Figure 7:
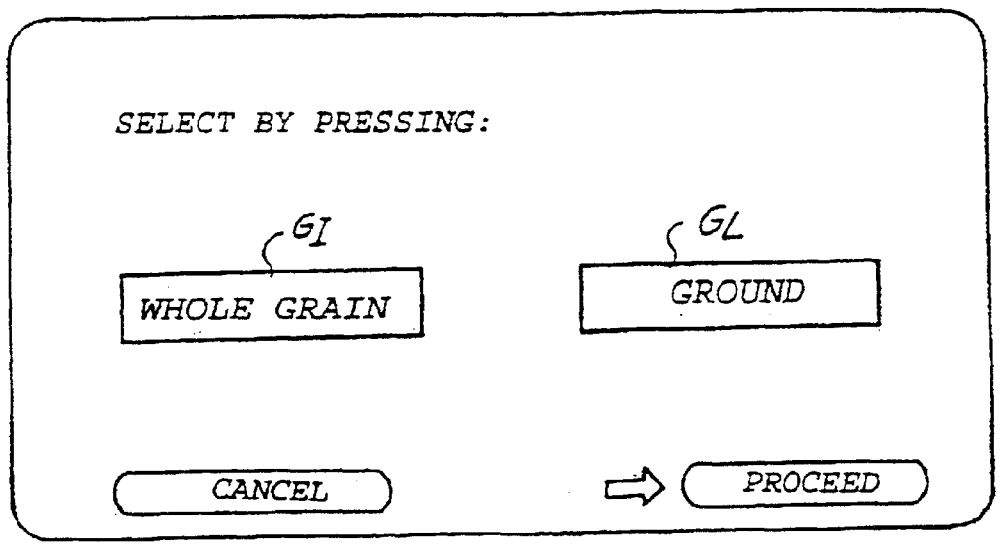
Figure 8:
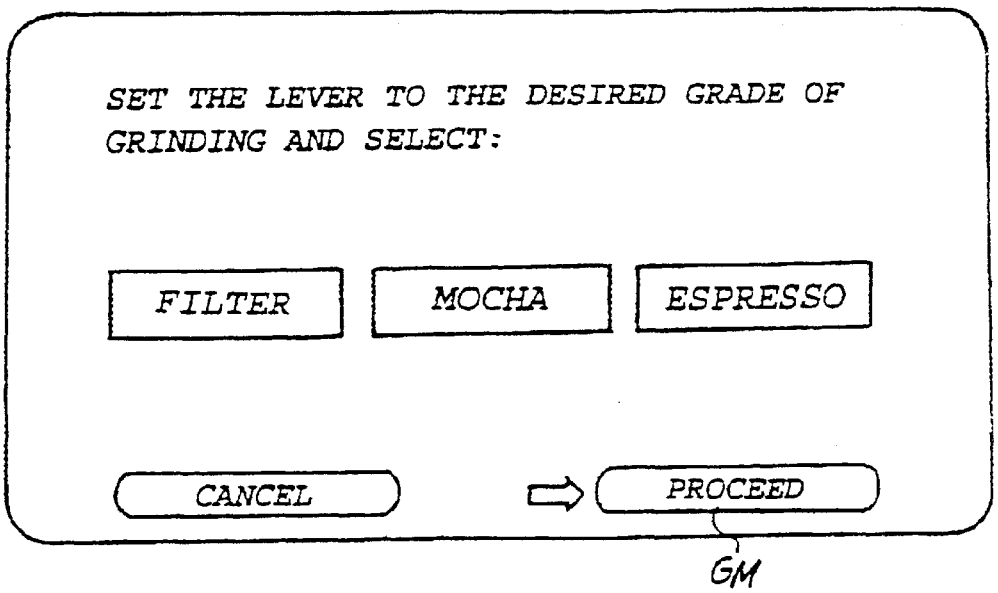

From an initial configuration as shown in FIG. 5, with a display of advertising information, a key 6A is used to start the selection procedure, by pressing this key 6A which can have the indication "start" on it. A text display as shown in FIG. 6 then appears, with a plurality of keys 6B showing, for example, the types of coffee beans contained in the various bin containers 19; an indication 6C can be placed next to each key 6B for the purposes stated below. A set of keys 6D enables the user to set the quantities to be taken from a single container 19 or from a plurality of different containers 19 to form a specific blend, for example, of coffee beans of the different varieties; these keys 6D will show indications of weights, for example weights in grams of 100 g, 150 g, 200 g, 250 g, 300 g, 400 g, 500 g, these being quantities which are generally required by customers and to which the possibilities of selection with the equipment in question are limited. When a particular product is requested by pressing the key 6B and a key 6D is pressed for the quantity required, the measured quantity which has been entered can appear on the corresponding indicator 6C, so that a customer can be kept informed of the entries made progressively in respect of quantities of products for the formation of a blend; the total quantity selected is indicated, for example, in an area 6E. An indication 6F of the price of the products requested by the entries that have been made can be provided in the configuration of FIG. 6, in local currency and in euros. A key 6G can be used to make any necessary correction or to cancel an entry; a key 6H can be used to continue the operations when the entry has been completed in a satisfactory way. When this key 6H is pressed, a display such as that shown in FIG. 7 can appear to indicate a choice between the whole-grain product and the ground product. This is indicated next to the keys GI and GL; pressing one or other of these causes the deflector 39 to be moved to the position 39A or 39B according to the choice made between the whole-grain product and the ground product. At this point, a display as shown in FIG. 8 can appear, with keys for entering the type of particle size required for grinding (when the grinding of the product has been requested by means of the key GL); the grinding assembly 45 can be directly operated by remote control, or the user can be asked to make a selection, by operating the knob 45A, if the entry is to be manual. A key GM controls the operation which is executed by causing the operation of one or other or of more than one of the dispensers 21A, 21B, 21C etc. (according to the request and the measured quantities), so that the entered quantity or quantities of the various products are discharged from the dispensers to the chamber 37 of the deflector, and the dispensed product or blend of products is sent to the duct 43 if the whole-grain product is required or to the duct 41 if grinding is required. The indicator lamps 17A and 17B can if necessary indicate, in a further configuration which can appear on the screen subsequently, whether the bag SA is absent from the housing 15A or the bag SB is absent from the housing 15B, with a warning to put the bag in position if it is not present. The starting of the operation by means of the key GM is subject to the presence of a bag in the housing 15A or 15B where it has to be present to receive the product.

After making the entries in the aforesaid way and having started the operation, the customer only has to collect the bag which has been filled and place it on the scales 13 so that precise weighing can be carried out and an indication can be given of the exact price to be paid, which will also be shown on the ticket supplied by the scales.

Clearly, equipment such as that described offers a range of possibilities covering all the customers' requirements, without any need for the presence of an operator and with the possibility of fast entry and fast operation. Within a given time interval, the equipment can serve a larger number of customers than can be served when one or even two specially assigned operators are present. The overall dimensions of the equipment are particularly limited, and this is particularly useful where equipment of this kind is to be provided in premises where the available space is relatively limited.

The equipment also provides many other advantages which will be evident to those operating in the business sector in which the equipment in question can be used.

It is to be understood that the drawing shows only an example provided solely as a practical demonstration of the invention, this invention being variable in its forms and arrangements without departure from the scope of the guiding concept of the invention. The presence of any reference numbers in the attached claims has the purpose of facilitating the reading of the claims with reference to the description and to the drawing, and does not limit the scope of protection represented by the claims.

What is claimed is:

1. Equipment for vending granular products, the equipment comprising:

a plurality of containers in the form of bins;

a dispenser in each of the containers and each including a brush rotor including longitudinal rows of tufts of bristles which form flexible diaphragms defining sector-shaped compartments, which can hold granules whose quantity is predetermined at least approximately, each rotor being controllable to perform programmable angular displacements;

one of a hopper or channel below the dispensers, to collect product by each dispenser;

a deflector in the hopper or channel;

two housings downstream of the deflector and each capable of supporting a packaging wrapper;

a grinder upstream from one of said housings;

a computerized apparatus for indicating and entering the individual selections and operations to be carried out for the measurement and dispensing of measured quantities into the packaging wrapper and for a selection command for requesting the product in whole-grain or ground form.

2. The equipment as claimed in claim 1, characterized in that the computerized apparatus comprises keys for selection of the product or products, keys for measured dispensing of the product or of each product, and a key for commanding activation of the dispenser of dispensers.

3. The equipment as claimed in claim 2, characterized in that the computerized apparatus can also comprise means for displaying information to be used for operations to be carried out in sequence.

4. The equipment as claimed in claim 3, characterized in that the computerized apparatus comprises display means and indicators for a selection of a degree of grinding to be carried out with the grinder.

5. The equipment as claimed in claim 1, scales for precise weighing and for supplying a corresponding ticket.

6. The equipment as claimed in claim 6, wherein:

said corresponding ticket includes adhesive for attaching to the packaging wrapper.

7. The equipment of claim 1, further comprising:

a sensor capable of indicating a presence of the packaging wrapper in one of the housing for permitting discharge.

8. The equipment of claim 1, wherein:

said rotor has a shaft with a substantially circular cross-section, said rows of bristles extend directly from said shaft.

* * * * *